United States Patent
Williams et al.

(10) Patent No.: US 12,241,044 B2
(45) Date of Patent: Mar. 4, 2025

(54) MULTI-LAYER DRYER SHEET FOLDED SUCH THAT INDENTED EMBOSSMENTS FACE TOWARDS ONE ANOTHER

(71) Applicant: The Procter & Gamble Company, Cincinnati, OH (US)

(72) Inventors: Kristin Rhedrick Williams, West Chester, OH (US); Amaranta Ramirez-Almaraz, Cincinnati, OH (US); Howard Jay Kalnitz, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 573 days.

(21) Appl. No.: 17/314,260

(22) Filed: May 7, 2021

(65) Prior Publication Data
US 2021/0348089 A1    Nov. 11, 2021

Related U.S. Application Data

(60) Provisional application No. 63/022,039, filed on May 8, 2020.

(51) Int. Cl.
*C11D 1/62* (2006.01)
*C11D 3/00* (2006.01)
*C11D 17/04* (2006.01)

(52) U.S. Cl.
CPC .............. *C11D 17/047* (2013.01); *C11D 1/62* (2013.01); *C11D 3/001* (2013.01)

(58) Field of Classification Search
CPC ....... C11D 1/62; C11D 17/047; C11D 17/041; C11D 17/00391; C11D 17/061
See application file for complete search history.

(56) References Cited

U.S. PATENT DOCUMENTS

| | | | |
|---|---|---|---|
| 4,170,678 A | 10/1979 | Stevens et al. | |
| 4,259,373 A * | 3/1981 | Demessemaekers | D06F 58/203 510/516 |
| 4,642,258 A * | 2/1987 | Majewski | D06M 23/02 510/519 |
| 4,659,496 A * | 4/1987 | Klemm | C11D 3/001 206/568 |
| 4,733,774 A * | 3/1988 | Ping, III | C11D 3/001 206/0.5 |
| 4,735,738 A | 4/1988 | Willman | |
| 4,828,746 A * | 5/1989 | Clauss | C11D 17/0039 510/297 |
| 4,839,076 A * | 6/1989 | Willman | C11D 17/047 206/0.5 |
| 4,867,023 A | 9/1989 | Kozyrski et al. | |
| 5,002,681 A * | 3/1991 | Wierenga | C11D 17/047 510/330 |
| 6,040,286 A * | 3/2000 | Huff | D06F 39/024 206/524.1 |
| 6,315,800 B1 | 11/2001 | Gomes et al. | |
| 2008/0004204 A1* | 1/2008 | Tindel-Koukal | C11D 1/72 510/516 |
| 2008/0076696 A1 | 3/2008 | Uitenbrock et al. | |
| 2009/0127149 A1* | 5/2009 | Samarcq | B65D 5/4204 221/63 |
| 2016/0090566 A1 | 3/2016 | Ramirez et al. | |
| 2016/0101204 A1* | 4/2016 | Lynch | C11D 17/042 510/438 |

OTHER PUBLICATIONS

PCT Search Report and Written Opinion for PCT/US2021/029789 dated Aug. 4, 2021, 12 pages.

* cited by examiner

*Primary Examiner* — Charles I Boyer
(74) *Attorney, Agent, or Firm* — Gary J. Foose; Carolyn S. Powell (57) ABSTRACT

A dryer sheet including: a nonwoven fibrous first layer and a nonwoven fibrous second layer joined to the first layer. The first layer has a first layer interior surface. The first layer has a first layer exterior surface area. The second layer has a second layer exterior surface area. The dryer sheet includes a fabric softener composition. Part of the fabric softener composition is on said first layer interior surface and partially penetrating into said first layer. The first layer exterior surface is free from said fabric softening composition over more than about 60% of said first layer exterior surface. The second layer exterior surface is free from said fabric softening active over more than about 60% of said second layer exterior surface.

18 Claims, 10 Drawing Sheets

MULTI-LAYER DRYER SHEET FOLDED SUCH THAT INDENTED EMBOSSMENTS FACE TOWARDS ONE ANOTHER

FIELD OF THE INVENTION

Multilayer dryer sheet for use in a tumble dryer.

BACKGROUND OF THE INVENTION

Dryer sheets are commonly employed in automatic laundry drying machines to provide softening, anti-static, and scent benefits to garments and other textiles. Within the last several years, manufacturers of automatic laundry drying machines have steadily increased the volume of the drum of the machine to enable drying in a single use a greater quantity of garments and other textiles. Meanwhile manufacturers of dryer sheets have maintained the size of individual dryer sheets and quantities of actives carried on the dryer sheet within certain ranges since consumers are comfortable manipulating such sized dryer sheets and it is convenient for manufacturers to compactly package such dryer sheets.

To account for the larger sizes of loads to be dried, manufacturers of dryer sheets have instructed users of dryer sheets to use multiple dryer sheets, depending on the size of the load. This requires consumers to perform a mental estimate of the number of dryer sheets needed to provide the desired benefit. Typically, consumers use too few dryer sheets to provide the promised benefit. Therefore, consumers are sometimes disappointed with the performance of the dryer sheet.

One way manufacturers could alleviate this disappointment is to provide greater quantities of active on dryer sheets having a traditional size. This can result in problems with fabric softening actives being unevenly transferred to garments and other textiles, which can result in staining of the garments and other textiles. Further, simply increasing the mass of actives carried by the dryer sheet may result in a large quantity of actives coating the surface of the dryer sheet. Many consumers do not like the feel of the actives on the dryer sheet. So providing greater quantities of active on the dryer sheet to provide for the desired level of performance, which may increase the consumer's contact with the active when he or she handles the dryer sheet, may be problematic to consumers.

With these limitations in mind, there is a continuing unaddressed need for dryer sheets that can deliver a sufficient quantity of fabric softening benefit to large loads of laundry without staining and have an acceptable feel to users.

SUMMARY OF THE INVENTION

A dryer sheet comprising: a nonwoven fibrous first layer, the first layer having a first layer interior surface and a first layer exterior surface opposing the first layer interior surface, wherein the first layer exterior surface has a first layer exterior surface area; a nonwoven fibrous second layer joined to the first layer, the second layer having a second layer interior surface and a second layer exterior surface opposing the second layer interior surface, wherein the second layer exterior surface has a second layer exterior surface area, wherein the second layer interior surface is oriented towards the first layer interior surface; and a fabric softener composition, wherein part of the fabric softener composition is on the first layer interior surface and partially penetrating into the first layer; wherein the first layer exterior surface is free from the fabric softening composition over more than about 60% of the first layer exterior surface; wherein the second layer exterior surface is free from the fabric softening active over more than about 60% of the second layer exterior surface; and wherein the fabric softener composition is present at a weight ratio relative to the first layer and the second layer combined from about 10:1 to about 1000:1.

A process for forming a dryer sheet comprising the steps of: providing a nonwoven fibrous web having a top surface and an opposing bottom surface and a pair of web transverse edges; applying to the top surface the fabric softener composition; folding the nonwoven fibrous web toward the top surface about a fold line dividing the first layer and the second layer to bring the web transverse edges into alignment with one another so that the second layer is above the first layer; and cutting the nonwoven fibrous web to form the dryer sheet.

A process for forming the dryer sheet comprising the steps of: providing a first layer and a second layer; applying to a first layer interior surface of the first layer and a second layer interior surface of the second layer a fabric softener composition; flipping one of the first layer and the second layer; stacking the first layer and the second layer so that the first layer interior surface is oriented towards the second layer interior surface; and bonding the first layer to the second layer.

DETAILED DESCRIPTION OF THE INVENTION

Nonwoven Fibrous Materials

Nonwoven fibrous materials provide for adequate function as a carrier of fabric softening compositions. Fabric softening compositions comprise fabric softening actives. The nonwoven fibrous material can be a polyester nonwoven fibrous material. For example, the nonwoven fibrous material can be polyester terephthalate. The nonwoven fibrous material can be a spun bonded polyester terephthalate. Optionally, the nonwoven fibrous material can be continuous filament spun bonded polyester terephthalate. Other nonwoven fibrous materials, such as rayon, can also be practical.

The nonwoven fibrous material can have a basis weight from about 10 g/m$^2$ to about 50 g/m$^2$. Such fibrous materials have sufficient constitution to carry the desired quantity of fabric softening composition.

To provide for the desired release of the fabric softening composition, the nonwoven fibrous material can have a permeability of from about 50 Darcys to about 150 Darcys, optionally about 90 Darcys to about 140 Darcys. The fibers constituting the nonwoven fibrous material can have a denier from about 2 to about 6. The nonwoven fibrous material can have a caliper from about 0.1 mm to about 0.5 mm, or optionally from about 0.1 mm to about 0.4 mm The greater the caliper, the more space within the nonwoven fibrous material to hold fabric softener composition.

The nonwoven fibrous material can be a continuous filament of polyester homopolymer and binder filaments formed of a polyester copolymer. The nonwoven fibrous material can be a polyolefin nonwoven. The nonwoven fibrous material can be spunbonded nonwoven. The nonwoven fibrous material can be an area bonded or point bonded nonwoven. The nonwoven fibrous material can be a spun bonded polyethylene terephthalate having trilobal fibers having a denier from about 5 to about 6. The nonwoven fiberous material can be a spun bonded a bicomponent fiber having a polyethylene terephthalate core and copolyethylene terephthalate with isophthatlate and or mixture thereof.

The nonwoven fibrous material can comprise bicomponent fibers. The bicomponent fibers can be core-sheath constructions or lobed constructions. The nonwoven fibrous material can comprise bicomponent fibers that are polyethylene/polyethylene terephthalate core-sheath constructions, with either constituent forming the core or sheath. The bicomponent fibers can be polyethylene/polypropylene, with either constituent forming the core or sheath.

The nonwoven fibrous material can be the nonwoven fibrous material used presently or in the past or like that used presently or in the past in BOUNCE dryer sheets, available from The Procter & Gamble Company, Cincinnati, Ohio, United States of America, SNUGGLE dryer sheets, available from Henkel Corporation, Stamford, Conn., United States of America, and or SUAVITEL dryer sheets, available from Colgate-Palmolive Company, New York, N.Y., United States of America.

The nonwoven fibrous material can be cellulose.

Fabric Softening Compositions

The dryer sheets can comprise a fabric softening composition. The fabric softening composition can be the fabric softening composition used presently or in the past or like that used presently or in the past in BOUNCE dryer sheets, available from The Procter & Gamble Company, Cincinnati, Ohio, United States of America, SNUGGLE dryer sheets, available from Henkel Corporation, Stamford, Conn., United States of America, and or SUAVITEL dryer sheets, available from Colgate-Palmolive Company, New York, N.Y., United States of America The fabric softening composition can comprise from about 10% to about 90% quaternary ammonium compound. The quaternary ammonium compound can be ester and or amide linked.

The fabric softening composition can comprise a cationic nitrogen-containing compound such as a quaternary ammonium compound having one or two straight-chain organic groups of at least 8 carbon atoms; optionally one or two such groups of from 12 to 22 carbon atoms and, optionally be ester and or amide linked. Specific non-limiting examples of fabric softening actives include the following: Di Tallow, Di Methyl Ammonium Methyl Sulfate, N,N-di(oleyi-oxy-ethyl)-N,N-dimethyl ammonium chloride, N,N-di(canolyl-oxy-ethyl)-N,N-dimethyl ammonium chloride, N,N-di(oleyl-oxy-ethyl)-N-methyl, N-(2-hydroxyethyl) ammonium methyl sulfate, N,N-di(canolyl-oxy-ethyl)-N-methyl, N-(2-hydroxyethyl) ammonium methyl sulfate-, N,N-di(oleylamidoethyl)-N-methyl, N-(2-hydroxyethyl) ammonium methyl sulfate, N,N-di(2-oleyloxy oxo-ethyl)-N,N-dimethyl ammonium chloride, N,N-di(2-canolyloxy oxo-ethyl)-N,N-dimethyl ammonium chloride-, N,N-di(2-oleyloxyethylcarbonyloxyethyl)-N,N-dimethyl ammonium chloride, N,N-di(2-canolyloxyethylcarbonyloxyethyl)-N,N-dimethyl ammonium chloride, N-(2-oleyloxy ethyl)-N-(2-oleyloxy oxo-ethyl)-N,N-dimethyl ammonium chloride; N-(2-canolyloxy ethyl)-N-(2-canolyloxy oxo-ethyl)-N,N-dimethyl ammonium chloride, N,N,N-tri(oleyl-oxy-ethyl)-N-methyl ammonium chloride, N,N,N-tri(canolyi-oxy-ethyl)-N-methyl ammonium chloride-, N-(2-oleyloxy oxoethyl)-N-(oleyl)-N,N-dimethyl ammonium chloride, N-(2-canolyloxy oxoethyl)-N-(canolyl)-N,N-dimethyl ammonium chloride, 1,2-dioleyloxy N,N,N-trimethylammoniopropane chloride, and 5,2-dicanolyloxy N,N,N-trimethylammoniopropane chloride, and combinations thereof. In one embodiment, the fabric conditioning active is N,N-di(tallowyl-oxy-ethyl)-N-methyl, N-(2-hydroxyethyl) ammonium methyl sulfate.

The fabric softening composition may comprise ingredients such as a nonionic material. Suitable nonionic materials may include polyoxyalkylene glycols, higher fatty alcohol esters of polyoxyalkylene glycols, higher fatty alcohol esters of polyoxyalkylene glycols, ethoxylates of long chained alcohols of from 8 to 30 carbon atoms such as the ethoxylates of coconut, palm, tallow alcohols or hydrogenated alcohols with 4 to 40 moles of ethylene oxide, and alkanolamides. The fabric softening composition may further comprise, with or without a non-ionic material, fatty acids, ethoxylated fatty acids, and combinations thereof. Suitable fatty acids include those wherein the long chain is unsubstituted or substituted alkyl or alkenyl group of from about 8 to 30 carbon atoms. Examples of specific fatty acids are lauric, palmitic, stearic, oleic, and/or combinations thereof.

The fabric softening composition can comprise one or more organic compounds having at least one relatively long hydrocarbon group serving to provide lubricity and or antistatic effects. Among such groups are alkyl groups containing 8 or more carbon atoms or even 12 to 22 carbon atoms. Suitable fabric softening compositions can comprise cationic, anionic, nonionic, or zwitterionic compounds. Cationic nitrogen containing compounds such as quaternary ammonium compounds having one or two straight chain organic groups of at least eight carbon atoms are practical.

The fabric softening composition can contain less than about 5% by weight of fatty acid. The fabric softening composition can be selected from the group consisting of polyglyceryl distearate, parrafin wax, branched parrafin wax, polyglyceryl ethers, and combinations thereof.

Suitable fabric softening compositions include cationic, anionic, nonionic, or zwitterionic compounds. The fabric softening composition can be a quaternary imidazolinium salt. Optionally, the fabric softening composition can be a polyoxyalkylene glycol, including higher fatty alcohol esters of polyoxyalkylene glycol and higher fatty alcohol ethers of polyoxyalkylene glycol. The fabric softening composition can be a fatty acid ester of sorbitan and ethoxylates of such esters.

Adjuncts

The fabric softening composition can comprise a variety of adjuncts. The fabric softening composition may comprise unencapsulated perfume, encapsulated perfume, and combinations thereof. The encapsulated perfume, if provided, can be selected from the group consisting of friable encapsulates, moisture activated encapsulates, heat activated encapsulates and combinations thereof.

The fabric softening composition can comprise adjuncts selected from the group consisting of softening agents, soil release agents, anti-static agents, crisping agents, water/stain repellents, stain release agents, refreshing agents, disinfecting agents, wrinkle resistant agents, wrinkle release agents, odor resistance agents, malodor control agents, abrasion resistance and protection agents, solvents, insect/pet repellents, wetting agents, chlorine scavenging agents, optical brighteners, UV protection agents, skin/fabric conditioning agents, skin/fabric nurturing agents, skin/fabric hydrating agents, color protection agents, dye fixatives, dye transfer inhibiting agents, silicones, preservatives and anti-microbials, fungicides, fabric shrinkage-reducing agents, brighteners, hueing dyes, bleaches, chelants, antifoams, anti-scum agents, whitening agents, catalysts, cyclodextrin, zeolite, petrolatum, glycerin, triglycerides, vitamins, other skin care actives such as aloe vera, chamomile, shea butter and the like, mineral oils, and combinations thereof.

Dryer Sheet Structure

Figure 1:
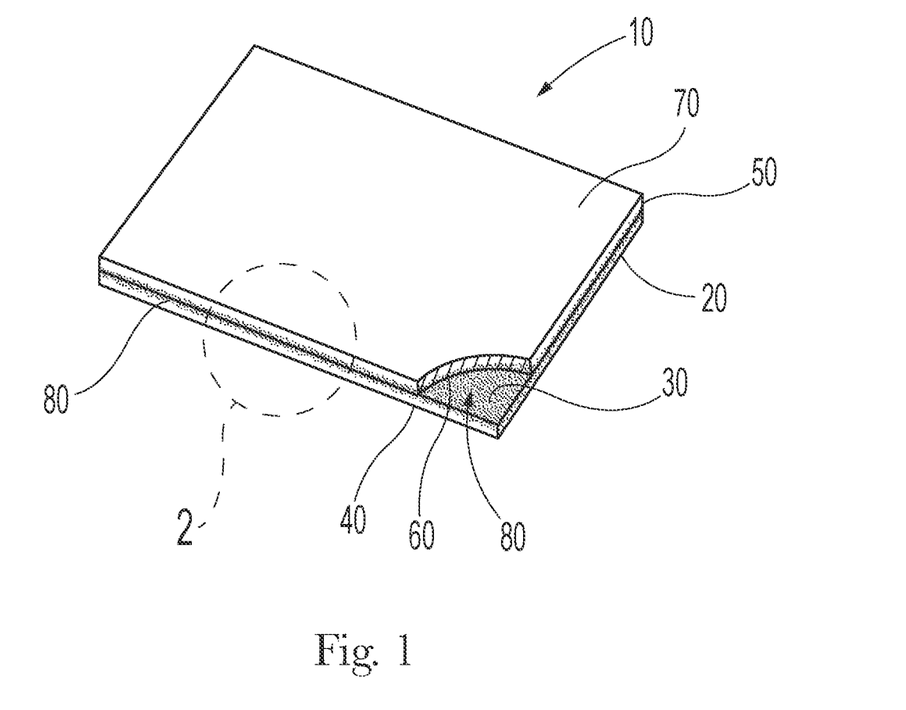
FIG. 1 is a view of dryer sheet in which a section of the second layer is removed.

A dryer sheet 10 is shown in FIG. 1. FIG. 1 is illustrated in multiple sections so that a sectional view of each layer and the dryer sheet 10 itself is visible. The dryer sheet 10 can comprise a nonwoven fibrous first layer 20. The first layer 20 has a first layer interior surface 30 and a first layer exterior surface 40 opposing the first layer interior surface 30. The first layer exterior surface 30 has a first layer exterior surface area. The first layer exterior surface area is a scalar quantity having units of length squared.

Likewise, the dryer sheet 10 can comprise a nonwoven fibrous second layer 50 joined to the first layer 20. The second layer 50 has a second layer interior surface 60 and a second layer exterior surface 70 opposing the second layer interior surface 60. The second layer exterior surface 70 has a second layer exterior surface area, which is a scalar quantity having units of length squared. The second layer interior surface 60 is oriented towards the first layer interior surface 30.

The second layer interior surface 60 can be oriented towards the first layer interior surface 30 so that there is an absence of any fibrous material or nonwoven fibrous material between the second layer interior surface 60 and the first layer interior surface 30. The second layer interior surface 60 can be in facing relationship with the first layer interior surface 30 so that the second layer interior surface 60 is in contact with the first layer interior surface 30.

By providing the first layer 20 and second layer 50 as described herein, a greater mass of fabric softener composition 80 per unit area of dryer sheet 10 can be practically provided as compared to a dryer sheet constituting a single layer of nonwoven fibrous material. Single layer dryer sheets suffer from a deficiency of interstitial spaces amongst the fibers to carry a fabric softener composition. If more fabric softener composition is provided on such a dryer sheet, some of the fabric softener composition may pile up on surface of the dryer sheet. Fabric softener composition in that caked or built up state may flake off and cause staining when used in a dryer.

Further, such fabric softener composition in that condition may release from the dryer sheet too quickly, thereby resulting in staining of the clothes in the dryer. Further, some users of such dryer sheets may not appreciate the feel of the fabric softener composition when he or she handles such a dryer sheet. The first layer 20 and second layer 50, as described herein, can effectively carry the fabric softener composition 80 in the interstitial spaces amongst the fibers and space between the first layer 20 and second layer 50 can store or carry fabric softener composition 80 deeply within the dryer sheet 10 so that the fabric softener composition 80 is not undesirably released from the dryer sheet 10 and the user comes into little or no physical contact with the fabric softener composition 80.

The dryer sheet 10 comprises a fabric softener composition 80. Part of the fabric softener composition 80 can be on the first layer interior surface 30 and partially penetrating into the first layer 20. The fabric softener composition 80 can be applied to the first layer interior surface 30 as part of a converting operation. The fabric softener composition 80 may be applied onto a surface of the fibrous material that ultimately becomes the first layer 20, the surface being what ultimately becomes the first layer interior surface 30. The fabric softener composition 80 may be applied using any of the known approaches for applying fabric softening composition 80 to a web of material, including but not limited to slot coating, spray coating, kiss rolling, printing, rotogravure, and other processes. When applied, the fabric softener composition 80 may partially penetrate into the first layer 20 so that some of the fabric softener composition 80 resides in the interstitial spaces amongst the fibers constituting the first layer 20. Partially penetrating means that the fabric softener composition 80 is present in at least some of the interstitial spaces amongst the fibers constituting the layer referred to but is not present through the full thickness of the layer referred to. Fabric softener composition 80 that is present through the full thickness of the layer referred to at some discrete location or all locations is not considered partially penetrating just because there is fabric softener composition 80 in some part of the thickness of the layer referred to notwithstanding that there is fabric softener composition 80 through the full thickness of the layer referred to at such location.

The first layer exterior surface 40 is free from the fabric softening composition 80 over more than about 60% of the first layer exterior surface 40. Similarly, the second layer exterior surface 70 is free from the fabric softener composition 80 over more than about 60% of the second layer exterior surface 70. This arrangement may limit the fraction of the exterior surfaces at which the user can feel or come into contact with the fabric softener composition 80. And this arrangement may also help to avoid staining of clothing treated with the dryer sheet 10 in the dryer by slowing down release of the fabric softening composition 80 during use in the dryer.

The first layer exterior surface 40 and or second layer exterior surface 70 can be free from the fabric softening composition 80 over more than about 70%, or more than about 80%, or more than about 90%, or more than about 95%, or 100% of the relevant layer exterior surface. The greater fraction of the relevant layer exterior surface that is free from the fabric softener composition 40, the less likely it is that the consumer may feel or come into contact with the fabric softening composition 80 and the less likely it is that the fabric softening composition 80 may stain the clothing being dried.

The fabric softening composition 80 can be present at a weight ratio relative to the first layer 20 and second layer 50 combined from about 10:1 to about 1000:1. Such weight ratios can provide for a sufficient mass of fabric softening composition 80 to provide the desired level of fabric softening benefit for a dryer sheet having an in plane area smaller than 600 cm², optionally smaller than 400 cm², optionally less than 200 cm², optionally about 150 cm².

Optionally, the fabric softener composition 80 can be on the second layer interior surface 60 and partially penetrating into the second layer 50. Depending on the converting operation employed, the desired level of fabric softening benefit to be provided, the desired planar dimensions and area of the dryer sheet 10, there may be a benefit to providing the fabric softener composition 80 with the second layer 50 so that more fabric softening composition 80 can be provided by the dryer sheet 10.

The first layer 20 can be integral with the second layer 50. Integral, in this sense, means that the first layer 20 and second layer 50 are constituted by a single continuous web of fibrous material so that there is some fiber constituting the first layer 20 and second layer 50 that is part of both the first layer 20 and second layer 50 and extends from the first layer 20 to the second layer 50.

Figure 2:
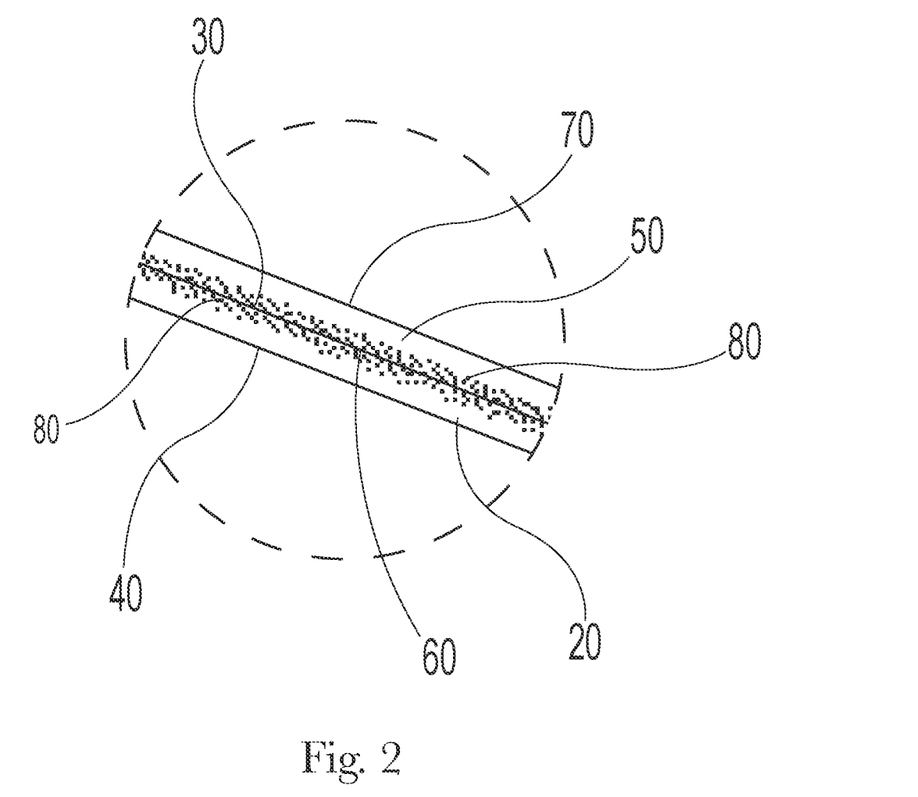
FIG. 2 is a partial view as marked in FIG. 1.

FIG. 2 is a partial view as marked in FIG. 1. As shown in FIG. 2, the fabric softener composition 80 can partially penetrate into the first layer 20 and second layer 50. That is the fabric softener composition 80 may not strike through one or both of the first layer exterior surface 40 and the second layer exterior surface 70 or only strike through a limited portion of one or both of the first layer 20 and second layer 50 as discussed above.

Figure 3:
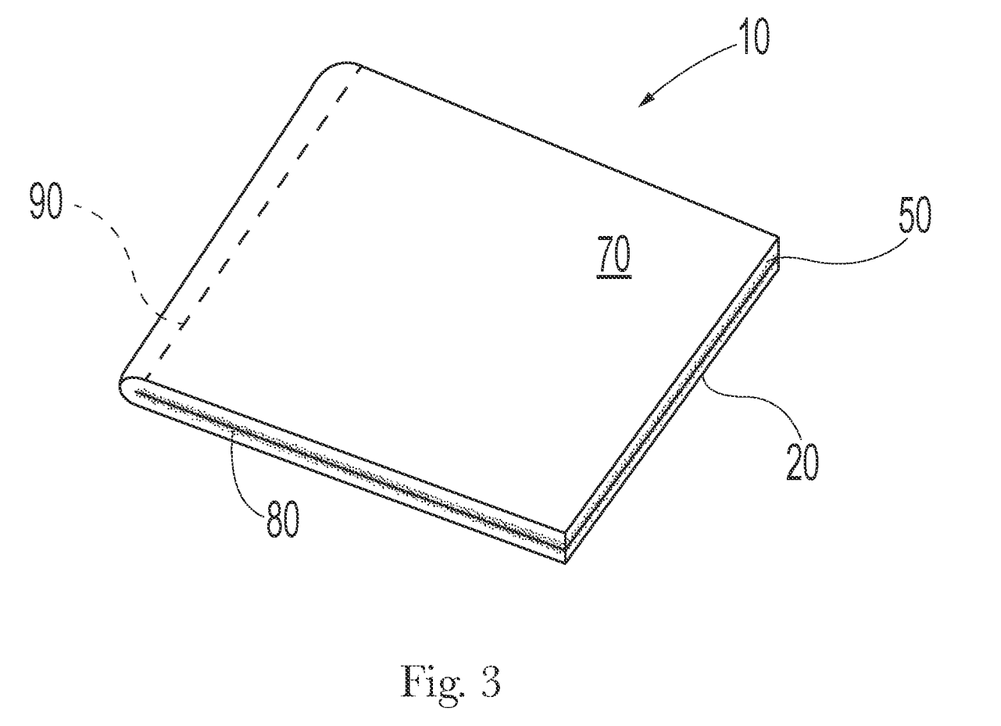
FIG. 3 is a dryer sheet constructed about a fold line.

A convenient arrangement in which the first layer 20 is integral with the second layer 50 is one in which a web of fibrous material is folded about a fold line 90, for example as shown in FIG. 3. This construction is convenient to manufacture on a converting line in that the fabric softener composition 80 can be applied to one side of a continuous web, the side that ends up being an interior surface, and the continuous web can be folded about the fold line 90 and then cut to form the dryer sheet 10. Optionally, the continuous web can be cut prior to folding if such converting process is desirable to the manufacturer.

If dryer sheet 10 has a fold line 90, the dryer sheet may unfold during use. This can be desirable in that user may see a transformation of the dryer sheet 10 as the fabric softening composition 80, which may help to maintain the dryer sheet 10 in a folded condition, is released and the dryer sheet 10 unfolds about the fold line 90. This transformation may provide insight to the user that the dryer sheet 10 has delivered the fabric softening composition 80 to the clothing.

Figure 4:
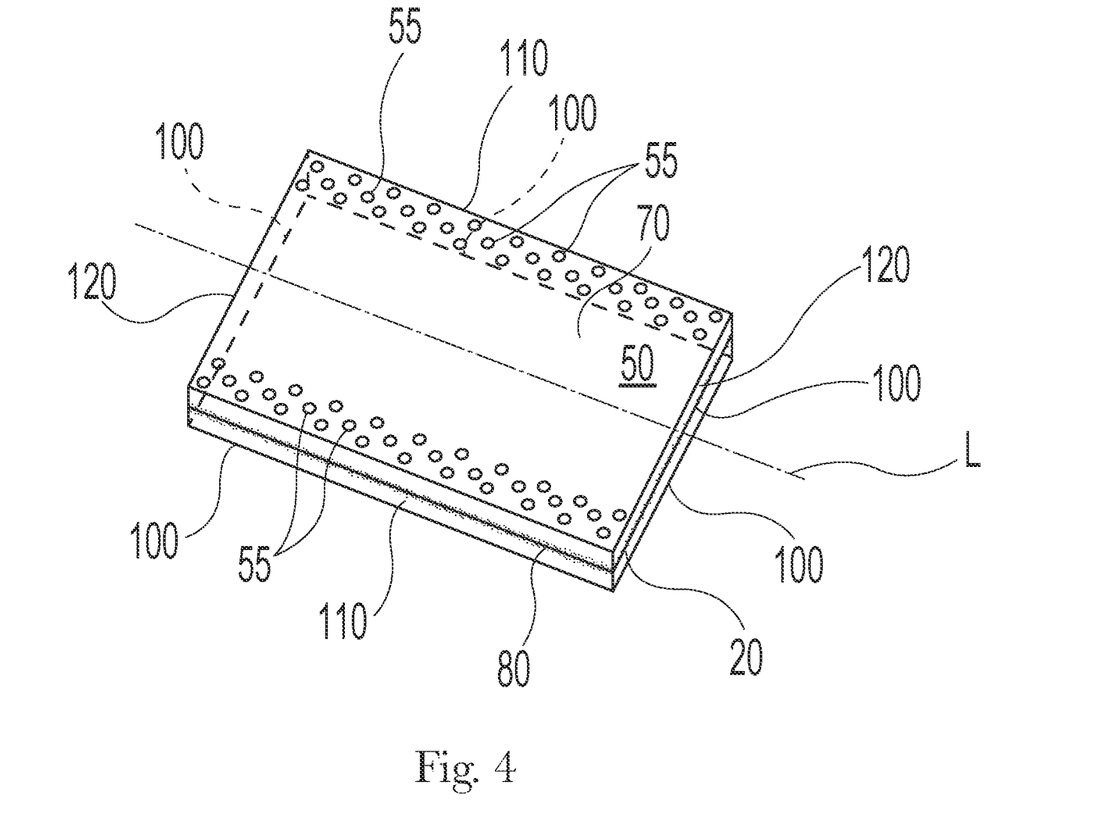
FIG. 4 is a dryer sheet that is bonded along the transverse edges.

If greater coherency of the dryer sheet is desired, in complement to the fold line 90, the first layer 20 can be bonded to the second layer 50, by way of nonlimiting example, as shown in FIG. 4. The first layer 20 has a first layer periphery 100 about the first layer. The term periphery is used to denote the edge of the material. The first layer 20 can be bonded to the second layer 50 about at least a portion of the first layer periphery 100. If the bonding is around the entire first layer periphery 100, the coherency of the dryer sheet 10 may be preserved during use in that the dryer sheet 10 may not unfold during use or the first layer 20 and second layer 50 may not become detached from one another.

The bonds 55 can be chemical bonds 55, mechanical bonds 55, thermal bonds 55, and combinations thereof.

Chemical bonds 55 can be formed by applying a liquid based bonding agent to the web. Three groups of materials are commonly used as binders, acrylate polymers and copolymers, styrene-butadiene copolymers, and vinyl acetate ethylene copolymers. Water based binder systems are the most widely used but powdered adhesives, foam and in some cases organic solvent solutions are also employed. There are many ways of applying the binder. It can be applied uniformly by impregnating, coating or spraying or intermittently, as in print bonding. Print bonding is used when specific patterns are desired and where it is necessary to have the majority of fibers free of binder for functional reasons.

Thermal bonds 55 can be formed by taking advantage of the thermoplastic properties of certain synthetic fibers to form bonds under controlled heating. In some cases the web fiber itself can be used, but more commonly a low melt fiber or bicomponent fiber is introduced at the web formation stage to perform the binding function later in the process. Thermal bonds 55 can be formed by using calendaring, which uses heat and high pressure applied through rollers to weld the fiber webs together at speed. Thermal bonds 55 can be formed by using through-air thermal bonding. This takes place in a carefully controlled hot air stream. Thermal bonds 55 can be formed using a drum and blanket system to apply pressure and heat. Thermal bonds 55 can be formed using sonic bonding, which occurs when the molecules of the fibers held under a patterned roller are excited by high frequency energy which produces internal heating and softening of the fibers.

Mechanical bonds 55 can be formed by entangling the fibers of the webs being bonded. Bonding is achieved by inter-fiber friction as a result of the physical entanglement of the fibers. Needle punching, stitch bonding, and hydroentanglement are examples of techniques for providing mechanical bonds 55.

The dryer sheet 10 can have a longitudinal axis L and a pair of opposing transverse edges 110 on opposite sides of the longitudinal axis L. The dryer sheet 10 can further have a pair of opposing longitudinal edges 120 along the longitudinal axis L. The first layer 20 and second layer 50 can be bonded to one another along the transverse edges 110. This will help to maintain a coherent structure of the dryer sheet 10 before, during, and after use. Optionally, the first layer 20 and second layer 50 can be bonded to one another along the transverse edges 110 and unbonded to one another at the longitudinal edges 120. This construction of the dryer sheet 10 can provide for a dryer sheet 10 that opens up into a tube during or after use to provide a visual signal that the dryer sheet 10 as performed as desired.

The transverse edges 110 can have a length from about 8 cm to about 30 cm, optionally about 10 cm to about 20 cm, optionally about 15 cm. The longitudinal edges 120 can have a length from about 5 cm to about 20 cm, optionally about 8 cm to about 15 cm, optionally about 10 cm. The length and width are the straight line lengths of the edge considered to the maximal extent of such edge, which means additional length of the respective edge that is provided by having an irregular or wavy edge is not considered in the measurement.

The dryer sheet 10 shown in FIG. 4 is one constructed of separate layers. Such a construction might be converted by providing a single continuous web, applying the fabric softening composition 80 to the continuous web, cutting the continuous web in the machine direction into two lanes, and flipping one of the lanes up and onto the other lane. The continuous stack can be cut in the cross direction to form the individual dryer sheets 10. Optionally, fabric softening composition 80 can be applied to one or both of an individually cut first layer 20 and an individually cut second layer 50, before or after cutting, and the individually cut second layer 50 can be stacked onto an individually cut first layer 20.

Figure 5:
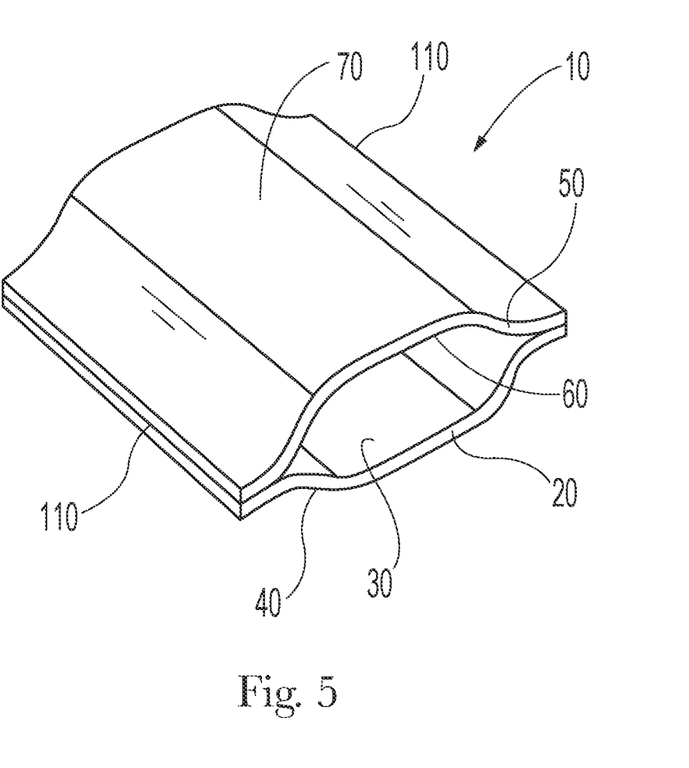
FIG. 5 is a dryer sheet that is opened up form a tube.

The transformation of a dryer sheet 10 like that shown in FIG. 4 or one that is constructed by providing a fold line 90 or assembling a first layer 20 and second layer 50 is illustrated in FIG. 5. As the fabric softening composition 80 is released, the interior surfaces of each of the layers may separate from one another but remain attached along the transverse edges 110. If a fold line 90 is employed, then one of the transverse edges 110 in FIG. 5 will be integral across what was the boundary between the first layer 20 and second layer 50 at that transverse edge 110 prior to use.

Figure 6:
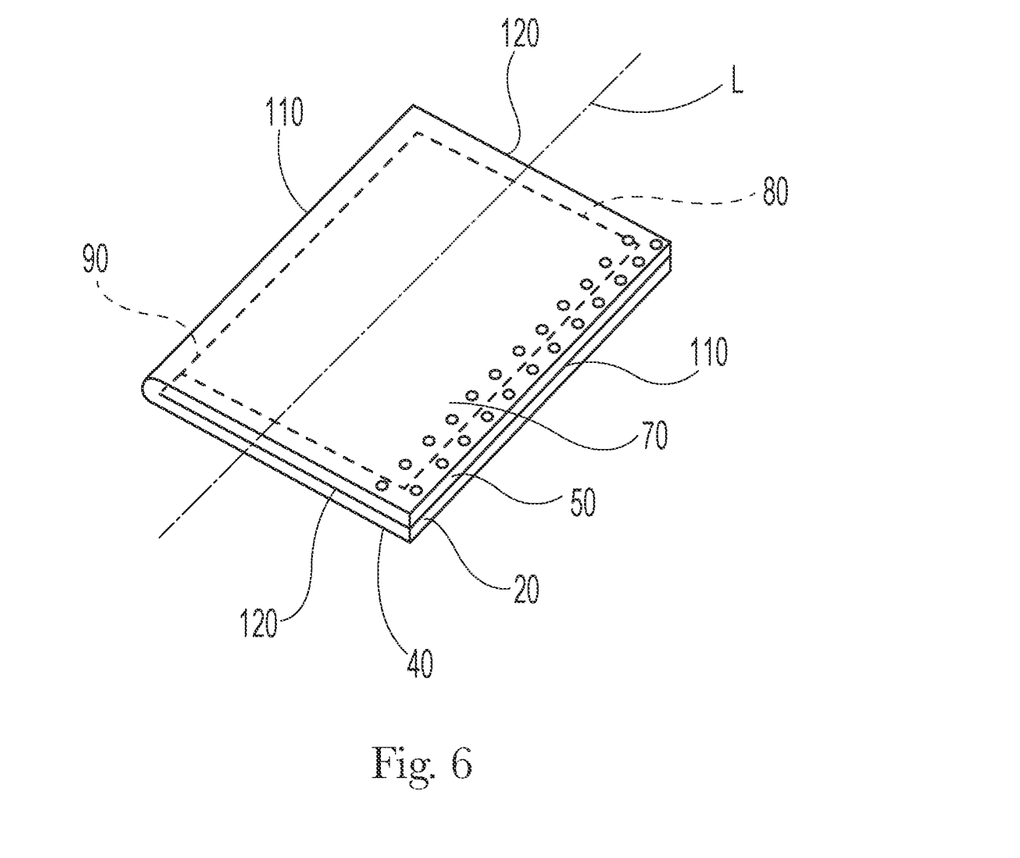
FIG. 6 is a dryer sheet constructed about a fold line.

If a fold line 90 is employed, the first layer 20 can be integral with the second layer 50 about the fold line 90 along one transverse edge 110 and the first layer 20 can be bonded to the second layer 50 along another transverse edge 110, as shown in FIG. 6. If a fold line 90 is employed and the longitudinal edges 120 are unbonded, then one of the transverse edges 110 in FIG. 5 will be integral across the boundary between the first layer 20 and second layer 50 at that transverse edge 110 prior to use which was observable prior to use of the dryer sheet 10.

Figure 7:
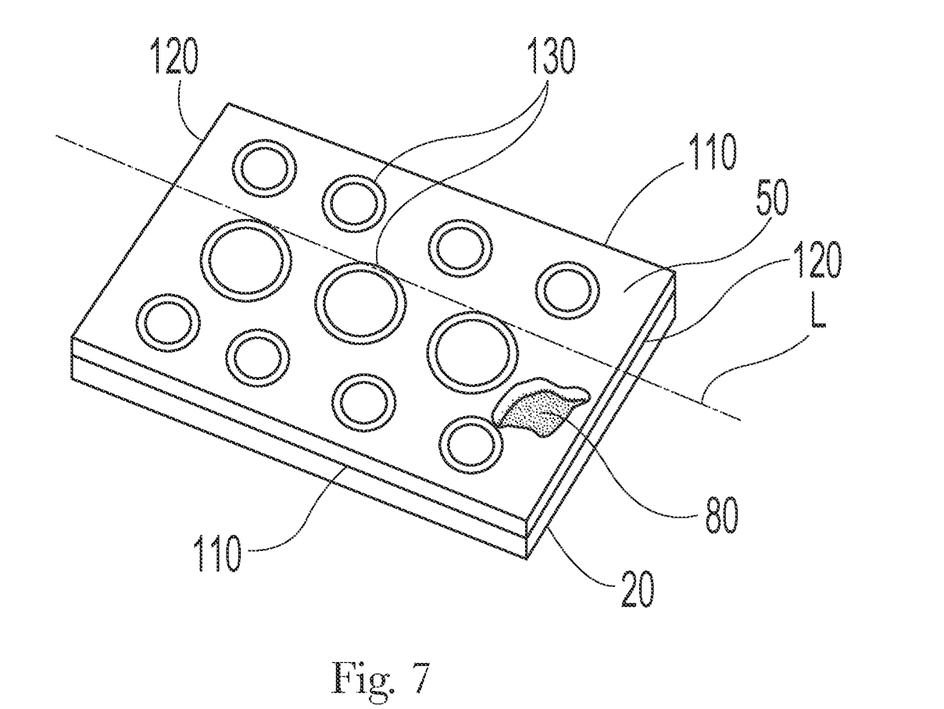
FIG. 7 is a dryer sheet having embossments.

One challenge for consumers handling dryer sheets is that the dryer sheet 10 may have little bending strength. Dryer sheets 10 that have low bending strength can be difficult for users to remove from a carton or other package containing the dryer sheets. The user may have difficulty with finding an edge of the dryer sheet 10 to grasp. For the dryer sheet 10 contemplated herein, which is a multilayer dryer sheet 10, the user 10 can be enabled to more easily grasp the dryer sheet 10 by providing a dryer sheet 10 that comprises a plurality of embossments 130, by way of nonlimiting example as shown in FIG. 7.

An embossment 130 is a portion of a surface of a layer that is deflected in a direction normal to its plane. A nonwoven fibrous layer can be embossed by impacting the deflected portion with or against a surface harder than the deflected portion of the nonwoven fibrous layer, for example an anvil or metal anvil, to disrupt the fibrous structure of the layer. A rotary process for embossing nonwoven fibrous material can be employed. Examples of embossing processes that may be employed include knob-to-knob embossing or nested embossing. Knob-to-knob embossing is conducted by juxtaposing two axially parallel rollers to form a nip between the knobs of the opposing rollers, the nip having a spacing less than the thickness of the material or materials to be embossed. Nested embossing is conducted by providing two parallel rollers having inter-engaged knobs to form a nip there between.

Figure 8:
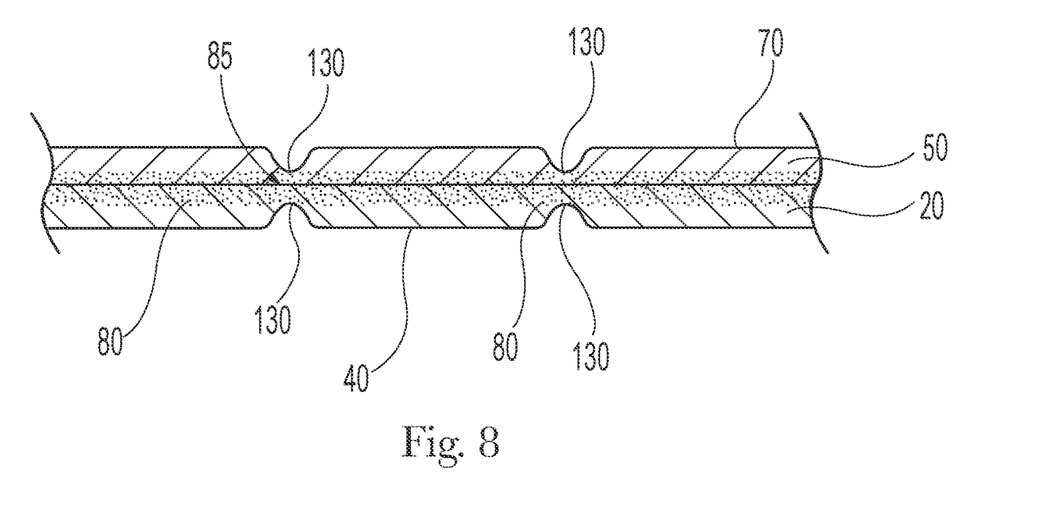
FIG. 8 is a cross sectional view of a dryer sheet having embossments.

The embossments 130 can be in the first layer 20 and second layer 50. The fabric softener composition 80 can fully penetrate the first layer 20 and second layer 50 at the location of the embossments 130. This can be beneficial because the fabric softener composition 80 has some mechanical strength. The combination of the mechanical strength of the fabric softener composition 80 and the fibers in the first layer 20 and second layer 50 can provide bending strength to the dryer sheet 10. In effect, at the locations of the embossments 130, the fabric softener composition 80 becomes a fiber reinforced fabric softener composition 130. Such fiber reinforced structures 85 can have a bending strength greater than the sum of the bending strength of individual components (FIG. 8). The embossments 130 can enhance the stiffness of the dryer sheet 10 and can make it convenient for the user to grasp the dryer sheet, which can feel like a stiff card to the user. The dryer sheet 10 can be held outwardly by an edge in any orientation and the dryer sheet may not completely fold over on itself. This can make it convenient for the user to pick out the dryer sheet 10 from its container and transfer it to the dryer.

The fully penetrating structure at the embossments 130 can arise as one or both of the first layer 20 and second layer 50 are embossed towards one another. The embossments 130 can be indentations of one or both of the exterior surfaces of the layers constituting the dryer sheet 10. As the embossing occurs, fabric softener composition 80 between the first layer 20 and second layer 50 and partially penetrating into one or both of the first layer 20 and second layer 50 can be driven further into one or both of the first layer 20 and second layer 50 as the first layer 20 and second layer 50 are squeezed at the location of the embossment 130. For fully penetrating, the fabric softener composition 80 exists all the way to the exterior surface of the respective layer. So when the fabric softener composition 80 fully penetrates the first layer and the second layer, the fabric softener composition 80 is continuous from the first layer exterior surface 30 to the second layer exterior surface 70 at the location of the embossment 130 being considered.

The area density of the embossed portion of the dryer sheet 10 can be used to control the percentage of the exterior surfaces of the layers that are free from the fabric softener composition 80. The greater the area density of the embossed portion of the dryer sheet 10 through which the fabric softener composition 80 is fully penetrating the layer being considered, the greater the area of the exterior surface of the layer being considered that is not free from fabric softener composition 80. Stated otherwise, the percentage of the exterior surface that is free from fabric softener composition 80 will tend to be greater the lesser the area density of the embossed of the embossed portions.

Pre-use and post-use, the dryer sheet 10 can change in character. Pre-use, the dryer sheet 10 is carrying the fabric softener composition 80. During use, the fabric softener composition 80 is transferred from within the dryer sheet 10, past the exterior surfaces of the layers constituting the dryer sheet 10, and onto the clothing being dried. The exterior hand of the dryer sheet 10, hand referring to the tactile character of the dryer sheet 10, can change pre-use to post use.

To provide for an adequate fabric softening benefit for large loads being dried, the first layer 20 can carry more than about 1.5 g of the fabric softener composition 80 and the second layer 50 can carry more than about 1.5 g of the fabric softener composition 80. The dryer sheet 10 can comprise more than about 3 g of the fabric softener composition. The dryer sheet 10 can comprise from about 3 g to about 6 g of the fabric softener composition. Such a high weight of fabric softening composition 80 can be provided with the dryer sheet 10 described herein because the fabric softening composition 80 can be carried by one or more of the layers and optionally between the layers in addition to the one or more layers. The combination of the two layers and possibly space between the two layers provide for adequate volume to carry the fabric softener composition 80 without having an overabundance of fabric softener composition 80 on the exterior surface of the layers. The dryer sheet 10 can comprise from about 3 g to about 9 g of the fabric softener composition. The dryer sheet 10 can comprise from about 3 g to about 6 g of the fabric softener composition. The dryer sheet 10 can comprise about 6 g of the fabric softener composition.

Process of Manufacture

Figure 9:
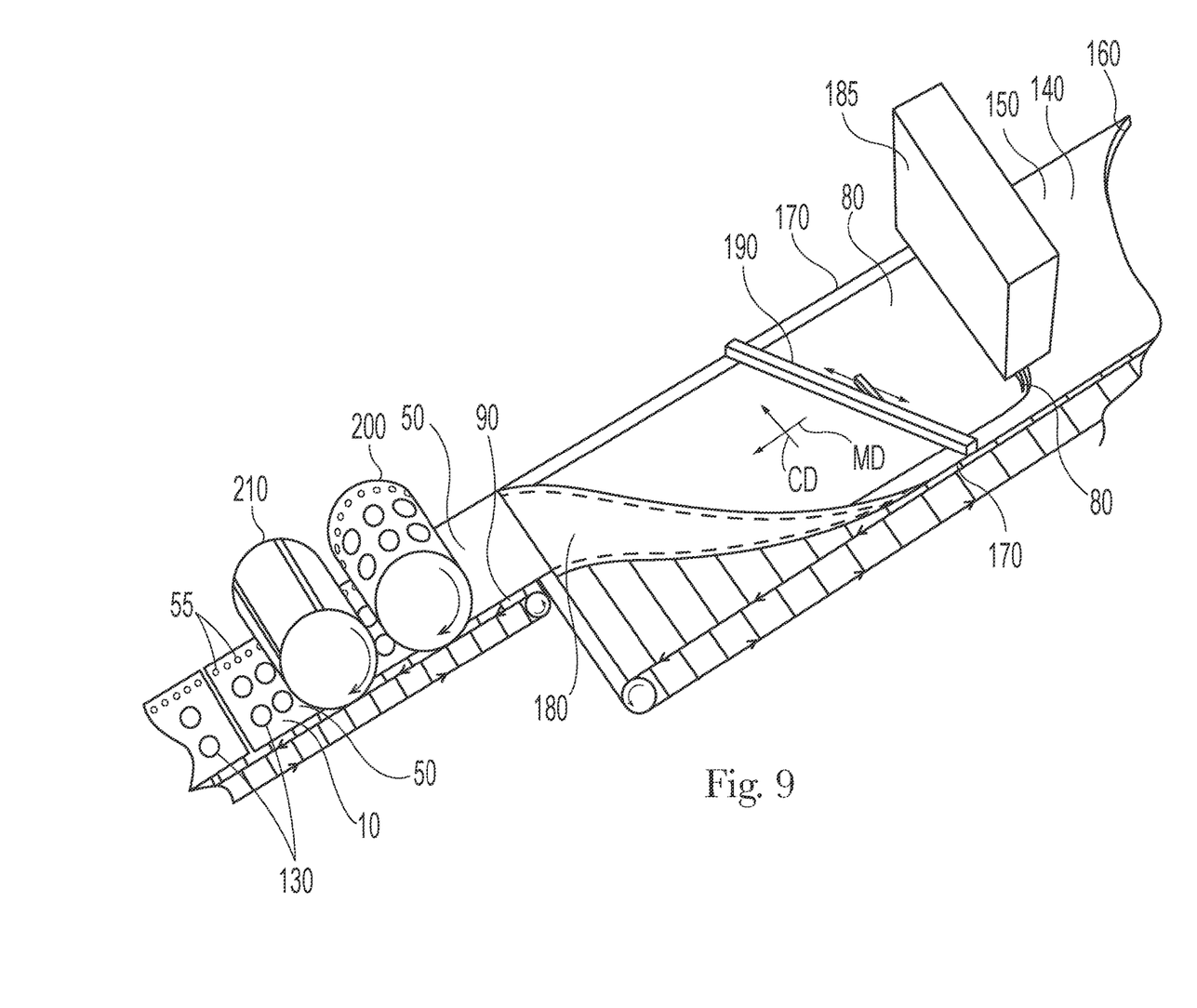
FIG. 9 is a schematic of a process for forming a dryer sheet.

The dryer sheet 10 can be practically formed using a continuous web converting process, as illustrated in FIG. 9. A nonwoven fibrous web 140 can be provided. The nonwoven fibrous web 140 can have a top surface 150 and an opposing bottom surface 160 and a pair of web transverse edges 170. A fabric softener composition 80 can be applied to the top surface 150. The nonwoven fibrous web 140 can be folded toward the top surface 150 about a fold line 90 that divides the first layer 20 and the second layer 50 to bring the web transverse edges into alignment with one another so that the second layer 50 is above the first layer 20. The nonwoven fibrous web 140 can be cut to form the dryer sheet 10. The nonwoven fibrous web 140 can practically be cut before it is folded or after it is folded but may be simpler to convert if the nonwoven fibrous web 140 is cut after being folded.

The fabric softener composition 80 can be applied to the top surface 150 by slot coating, spray coating, kiss rolling, printing, rotogravure, and other processes for applying the fabric softener composition 80 as a melt. One practical approach for applying fabric softening composition 80 to a nonwoven fibrous material, as the nonwoven fibrous layers are employed herein, is to slot coat the nonwoven fibrous material and use a scraper 190 set at or just above the surface to which the fabric softening composition 80 is applied to scrape off fabric softener composition 80 at some level at or above the surface of the nonwoven fibrous material so that excess fabric softener composition 80 is removed.

The fabric softener composition 80 may partially penetrate into the nonwoven fibrous web 140. The fabric softener composition 80 may be applied to one of what becomes the first layer interior surface 30 and or the second layer interior surface 60. The step of folding can be conveniently accomplished with a folding rail 180. Other folding process may be employed if the nonwoven fibrous web 140 is cut in the cross direction CD prior to folding or individual pieces of nonwoven fibrous web 140 are provided and then each dryer sheet 10 is folded individually.

Once the nonwoven fibrous web 140, or an individual piece of nonwoven fibrous web 140, is folded over on itself, the web transverse edges 170 can be bonded to one another. The step of bonding can be performed before or after the step of cutting in the cross direction CD. The bonding can provide coherency to the dryer sheet 10 as described previously.

Once the first layer 20 and second layer 50, or the pieces or parts of nonwoven fibrous web 140 that ultimately become the first layer 20 and second layer 50, are positioned as desired, the layers can be embossed to provide embossments 130 to the layers and to squeeze the fabric softener composition 80 within the layers so that the fabric softener composition 80 fully penetrates the layers. Embossing can be accomplished by an embossing roll such as a cylindrical roll having raised embossing features of the desired pattern that is in operative relationship with an anvil roll.

Figure 10:
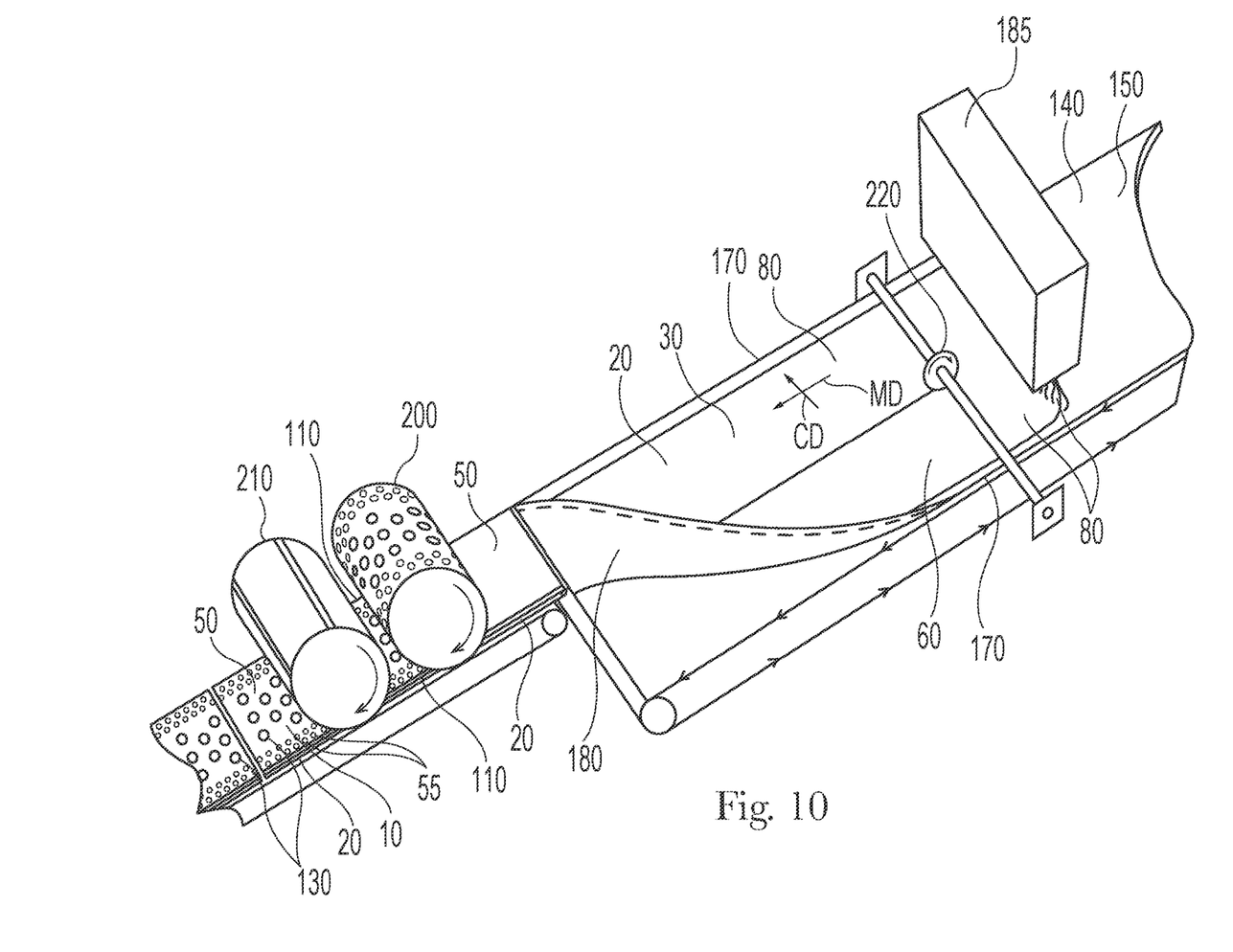
FIG. 10 is a schematic of a process for forming a dryer sheet.

Another approach for forming the dryer sheet 10 is to provide the first layer 20 and the second layer 50, by way of nonlimiting example as shown in FIG. 10. The first layer 20 and the second layer 50 can be provided integral with one another as a single nonwoven fibrous web 140 moving in the machine direction MD. The fabric softener composition 80 can be applied to the first layer interior surface 30 and or the second layer interior surface 60, if the first layer 20 and second layer 50 are provided as individual lanes, or the nonwoven fibrous web 140 can be cut in the machine direction MD after the fabric softener composition 80 is applied to form lanes of the material that ultimately becomes the first layer 20 and second layer 50.

One of the first layer 20 and the second layer 50 can be flipped. Flipping can position the surface of the layers to which fabric softener composition 80 is applied to be oriented towards one another when the first layer 20 is stacked onto the second layer 50. Flipping can be performed before or after the nonwoven fibrous web 140 is cut in the cross direction CD.

Once one of the layers is flipped, the first layer 20 and the second layer 50 can be stacked so that the first layer interior surface 30 is oriented towards the second layer interior surface 60. The first layer 20 can be bonded to the second layer 50, which provides the benefit of helping to maintain the form of the dryer sheet 10 before, during, and after use.

Combinations

An example is below:

A. A dryer sheet (10) comprising:
a nonwoven fibrous first layer (20), said first layer having a first layer interior surface (30) and a first layer exterior surface (40) opposing said first layer interior surface, wherein said first layer exterior surface has a first layer exterior surface area;
a nonwoven fibrous second layer (50) joined to said first layer, said second layer having a second layer interior surface (60) and a second layer exterior surface (70) opposing said second layer interior surface, wherein said second layer exterior surface has a second layer exterior surface area, wherein said second layer interior surface is oriented towards said first layer interior surface; and a fabric softener composition (80), wherein part of said fabric softener composition is on said first layer interior surface and partially penetrating into said first layer;
wherein said first layer exterior surface is free from said fabric softening composition over more than about 60% of said first layer exterior surface;
wherein said second layer exterior surface is free from said fabric softening active over more than about 60% of said second layer exterior surface; and
wherein said fabric softener composition is present at a weight ratio relative to said first layer and said second layer combined from about 10:1 to about 1000:1.

B The dryer sheet according to Paragraph A, wherein part of said fabric softener composition is on said second layer interior surface and partially penetrating into said second layer.

C. The dryer sheet according to Paragraph A or B, wherein said first layer is bonded to said second layer.

D. The dryer sheet according to any of Paragraphs A to C, wherein said first layer has a first layer periphery (100) and said first layer is bonded to said second layer about at least a portion of said first layer periphery.

E. The dryer sheet according to any of Paragraphs A to D, wherein said first layer is integral with said second layer about a fold line (90).

F. The dryer sheet according to any of Paragraphs A to D, wherein said dryer sheet has a longitudinal axis (L), a pair of opposing transverse edges (110) on opposite sides of said longitudinal axis and a pair of opposing longitudinal edges (120) along said longitudinal axis, wherein said first layer and said second layer are bonded to one another along said transverse edges and unbonded at said longitudinal edges.

G. The dryer according to any of Paragraphs A to D, wherein said dryer sheet has a longitudinal axis (L) and a pair of opposing transverse edges (110) on opposite sides of said longitudinal axis, wherein said first layer is integral with said second layer about a fold line (90)

along one said transverse edge and said first layer is bonded to said second layer along another said transverse edge.

H. The dryer sheet according to any of Paragraphs A to D, wherein said dryer sheet has a longitudinal axis (L), a pair of opposing transverse edges (110) on opposite sides of said longitudinal axis and a pair of opposing longitudinal edges (120) along said longitudinal axis, wherein said first layer and said second layer are bonded to one another along said transverse edges.

I. The dryer sheet according to any of Paragraphs A to H, wherein said dryer sheet comprises more than about 3 g of said fabric softening composition.

J. The dryer sheet according to any of Paragraphs A to I, wherein said first layer and said second layer are polyolefin nonwoven webs.

K. The dryer sheet according to any of Paragraphs A to J, wherein said dryer sheet comprises a plurality of embossments (130) in said first layer and said second layer through which said fabric softener composition fully penetrates said first layer and said second layer.

L. The dryer sheet according to any of Paragraphs A to K, wherein said fabric softener composition comprises a quaternary ammonium compound.

M. A process for forming the dryer sheet according to any of Paragraphs A to E and G comprising the steps of:
providing a nonwoven fibrous web (140) having a top surface (150) and an opposing bottom surface (160) and a pair of web transverse edges (170);
applying to said top surface said fabric softener composition;
folding said nonwoven fibrous web toward said top surface about a fold line (90) dividing said first layer and said second layer to bring said web transverse edges into alignment with one another so that said second layer is above said first layer; and
cutting said nonwoven fibrous web to form said dryer sheet.

N. The process according to Paragraph M, further comprising a step of bonding said web transverse edges to one another.

O. The process according to Paragraph M or N, further comprising a step of embossing said first layer and said second layer so that said fabric softener composition fully penetrates said first layer and said second layer.

P. A process for forming the dryer sheet according to any of Paragraphs A to D, F, and H to L comprising the steps of:
providing said first layer and said second layer;
applying to said first layer interior surface and said second layer interior surface said fabric softener composition;
flipping one of said first layer and said second layer;
stacking said first layer and said second layer so that said first layer interior surface is oriented towards said second layer interior surface; and
bonding said first layer to said second layer.

Q. The dryer sheet according to any of Paragraphs A to L, wherein said first layer carries more than about 3 g of said fabric softener composition and said second layer carries more than about 3 g of said fabric softener composition.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A dryer sheet comprising:
a nonwoven fibrous first layer, said first layer having a first layer interior surface and a first layer exterior surface opposing said first layer interior surface, wherein said first layer exterior surface has a first layer exterior surface area;
a nonwoven fibrous second layer joined to said first layer, said second layer having a second layer interior surface and a second layer exterior surface opposing said second layer interior surface, wherein said second layer exterior surface has a second layer exterior surface area, wherein said second layer interior surface is oriented towards said first layer interior surface; and
a fabric softener composition, wherein part of said fabric softener composition is on said first layer interior surface and partially penetrating into said first layer;
wherein said first layer exterior surface is free from said fabric softening composition over more than about 60% of said first layer exterior surface;
wherein said second layer exterior surface is free from said fabric softening active over more than about 60% of said second layer exterior surface; and
wherein said fabric softener composition is present at a weight ratio relative to said first layer and said second layer combined from about 10:1 to about 1000:1;
wherein said dryer sheet comprises a plurality of embossments in said first layer and said second layer, wherein the embossment in said first layer is an indention in the first layer exterior surface and the embossment in said second layer is an indention in the second layer exterior surface such that the embossments of said first layer and said second layer are towards one another, wherein at said embossments said fabric softener composition fully penetrates through said first layer and said second layer.

2. The dryer sheet of claim 1, wherein part of said fabric softener composition is on said second layer interior surface and partially penetrating into said second layer.

3. The dryer sheet of claim 1, wherein said first layer is integral with said second layer about a fold line.

4. The dryer sheet of claim 1, wherein said first layer has a first layer periphery and said first layer is bonded to said second layer about at least a portion of said first layer periphery.

5. The dryer sheet of claim 1, wherein said first layer is bonded to said second layer.

6. The dryer sheet of claim 1, wherein said dryer sheet has a longitudinal axis, a pair of opposing transverse edges on opposite sides of said longitudinal axis and a pair of opposing longitudinal edges along said longitudinal axis, wherein said first layer and said second layer are bonded to one another along said transverse edges and unbonded at said longitudinal edges.

7. The dryer sheet of claim 1, wherein said dryer sheet has a longitudinal axis and a pair of opposing transverse edges on opposite sides of said longitudinal axis, wherein said first layer is integral with said second layer about a fold line along one said transverse edge and said first layer is bonded to said second layer along another said transverse edge.

8. The dryer sheet of claim 1, wherein said dryer sheet has a longitudinal axis, a pair of opposing transverse edges on opposite sides of said longitudinal axis and a pair of opposing longitudinal edges along said longitudinal axis, wherein said first layer and said second layer are bonded to one another along said transverse edges.

9. The dryer sheet of claim 1 wherein said dryer sheet comprises more than about 3 g of said fabric softening composition.

10. The dryer sheet of claim 1, wherein said first layer and said second layer are polyolefin nonwoven webs.

11. The dryer sheet according to claim 1, wherein said fabric softener composition comprises a quaternary ammonium compound.

12. The dryer sheet of claim 11, wherein said dryer sheet comprises more than about 3 g of said fabric softening composition.

13. The dryer sheet according to claim 12, wherein said dryer sheet has a longitudinal axis and a pair of opposing transverse edges on opposite sides of said longitudinal axis, wherein at each of said transverse edges, said first layer and said second layer are either bonded to one another or integral with one another.

14. A process for forming the dryer sheet according to claim 1 comprising the steps of:
   providing a nonwoven fibrous web having a top surface and an opposing bottom surface and a pair of web transverse edges;
   applying to said top surface said fabric softener composition;
   folding said nonwoven fibrous web toward said top surface about a fold line dividing said first layer and said second layer to bring said web transverse edges into alignment with one another so that said second layer is above said first layer; and
   cutting said nonwoven fibrous web to form said dryer sheet.

15. The process according to claim 14, further comprising a step of bonding said web transverse edges to one another.

16. The process according to claim 14, further comprising a step of embossing said first layer and said second layer so that said fabric softener composition fully penetrates said first layer and said second layer.

17. A process for forming the dryer sheet according to claim 1 comprising the steps of:
   providing said first layer and said second layer;
   applying to said first layer interior surface and said second layer interior surface said fabric softener composition;
   flipping one of said first layer and said second layer;
   stacking said first layer and said second layer so that said first layer interior surface is oriented towards said second layer interior surface; and
   bonding said first layer to said second layer.

18. The dryer sheet of claim 1 wherein said first layer carries more than about 1.5 g of said fabric softener composition and said second layer carries more than about 1.5 g of said fabric softener composition.

\* \* \* \* \*